UNITED STATES PATENT OFFICE.

LUDWIG RISSMÜLLER, OF NEWARK, NEW JERSEY, AND HENRY VOLLBRECHT, OF NEW YORK, N. Y., ASSIGNORS TO THE NEWARK CHEMICAL WORKS, OF NEWARK, NEW JERSEY.

MANUFACTURE OF SUPERPHOSPHATES.

SPECIFICATION forming part of Letters Patent No. 494,940, dated April 4, 1893.

Application filed September 24, 1891. Serial No. 406,702. (No specimens.)

*To all whom it may concern:*

Be it known that we, LUDWIG RISSMÜLLER, of Newark, New Jersey, and HENRY VOLLBRECHT, of the city and State of New York, have invented certain Improvements in the Treatment of Animal Carcasses, Offal, and Bones for the Separate Collection of the Fat and the Manufacture of Nitrogenous Superphosphates Therefrom, of which the following is a specification.

There have heretofore been practiced two methods of treating bones and other animal matters for the extraction of the fat and manufacture of fertilizers therefrom. In one method they are rendered by treatment in boiling water. In addition to the sanitary objections to this mode of treatment, it is to be remarked that certain portions of the fat are so inclosed, especially in the bones, that they cannot be freed by boiling in water or by evaporation, and hence such portions of the fat are lost. In the other method referred to, the raw material is treated in a closed vessel with extracting agents, such as benzine or other hydrocarbons; but such extracting agents cannot be wholly recovered, and there is hence a loss which materially enhances the cost of the product. Bones treated by either of the methods referred to retain their natural structure, and are necessarily dried and ground in order to convert them into a bone meal, or superphosphate, but this involves a sensible loss of nitrogen.

The objects of the present invention are to obtain all the commercially valuable constituents present in the raw material without the loss of any of the fat or any of the nitrogen, and at the same time to render the phosphoric acid present soluble, and also to avoid the sanitary objections referred to. These objects are attained by dissolving the organic substances present in the raw material in hot sulphuric acid of high density, and by continuously skimming off and separately collecting the fat as fast as it rises to the surface during the formation of the solution, and by converting the solution, after the removal of the fat, into nitrogenous superphosphate by the addition thereto of a suitable quantity of mineral phosphate, such as phosphate of lime or other phosphate which does not contain phosphoric acid in soluble form.

In carrying this process into effect, certain conditions are to be established, and certain difficulties to be avoided. It is to be remarked that the effectiveness of the concentrated sulphuric acid as a solvent of the organic substances present in the raw material depends somewhat upon the scale of the operation, and that it is most effective when employed in a large volume upon a large quantity of raw material. There is then manifested what may be called mass action, as the result of which the organic substances are rapidly dissolved. The quantity of acid employed will vary according to the amount of moisture present in the raw material. When the raw material contains, say, not over fifty per cent. of moisture, it will be sufficient to submerge it in a bath of hot sulphuric acid of 50° Baumé. If the amount of moisture present in the raw material greatly exceeds fifty per cent., a larger quantity of acid may be required in order to prevent such excess of moisture from too greatly reducing the density of the acid and thereby diminishing its effectiveness as a dissolving agent. On the other hand, if the raw material contains considerably less than fifty per cent. of moisture, as, for example, if it consists of butcher bones alone, a less quantity of acid may be required, or an acid of lower density, say 40° or 45° may be high enough for the required purpose.

One of the serious difficulties to be guarded against is the tendency of the fat and fat acids to form an emulsion with the gypsum which is formed when the bones commence to dissolve. It is hence necessary that the fats and fat acids shall be skimmed off as fast as they rise to the surface of the treating bath, and that there shall be no such mechanical disturbance of the raw material during its treatment as would be caused by stirring, or by the injection of steam directly into it, or by ebullition.

While it is desirable to maintain the raw material and the treating bath at a high temperature, care must therefore be taken not to allow the temperature to rise to the boiling point.

The treating operation is performed in a leaden vat which may be heated externally, and which may have arranged in it a heating coil of lead pipes.

In carrying the process into operation, the vat is partly filled with sulphuric acid of a suitably high density, and after the acid has been heated to a temperature of say, 200° Fahrenheit, the raw material is submerged in it, and the heat maintained until the temperature, reduced by the introduction of the raw material, has again been brought up to 200° Fahrenheit, care being taken not to raise the temperature so quickly as to cause foaming by the too rapid generation of carbonic acid from the carbonate of lime present in the raw material. The fat and the fat acids, skimmed off the surface of the resultant solution as fast as they rise, are separately collected for commercial disposal. During the treatment the gypsum present is precipitated to the bottom of the vat in the form of a muddy sediment. The phosphoric acid and the nitrogen present are rendered soluble by the sulphuric acid. An excess of acid is preferably employed, and to convert the solution into a fertilizer there is added to it a sufficient quantity of raw phosphate of lime to take up the free sulphuric acid present, which free acid also renders substantially all the phosphoric acid of the added phosphate soluble. The resulting product is a comparatively dry fertilizer in condition for use.

The sanitary advantages of the process are obvious:—The germs originally present in the raw material are destroyed, and there is an entire absence of the stenches which make the ordinary processes of rendering so disagreeable. Owing to the destruction of the germs, the process may be carried on without endangering the health of persons engaged in or residing near the disposal works.

What is claimed as the invention is—

The herein-described improvement in the treatment of animal carcasses, offal and bones for the separate collection of the fat, and the manufacture of nitrogenous superphosphates therefrom, which consists in subjecting the raw material to the action of sulphuric acid of high density to a temperature of about 200° Fahrenheit until the nitrogenous substances present are dissolved, and in skimming off and separately collecting the fat and fat acids as fast as they are freed and rise to the surface, and in finally adding to the remaining solution sufficient raw phosphate to take up all the free sulphuric acid present, and thereby form in condition for use as a fertilizer a comparatively dry nitrogenous superphosphate, substantially all the phosphoric acid in which is soluble, and which contains also in soluble form all the nitrogen originally present in the raw material.

L. RISSMÜLLER.
H. VOLLBRECHT.

Witnesses:
M. L. ADAMS,
A. M. JONES.